United States Patent [19]
Moreno et al.

[11] Patent Number: 5,315,290
[45] Date of Patent: May 24, 1994

[54] CART THEFT PREVENTION SYSTEM

[75] Inventors: Raul G. Moreno, Phoenix, Ariz.; Paul J. Oster, Chino, Calif.

[73] Assignee: Computron, Inc., Chino, Calif.

[21] Appl. No.: 926,304

[22] Filed: Aug. 10, 1992

[51] Int. Cl.$^5$ .................. G08B 13/14; B62D 39/00
[52] U.S. Cl. .................. 340/568; 280/33.994; 340/539; 361/170; 455/344
[58] Field of Search ............ 340/568, 571, 572, 551, 340/539, 988, 426, 825.49, 825.47; 341/176; 455/66, 68, 70, 344; 280/33.994, DIG. 4, DIG. 5; 70/225-226; 361/170, 179; 364/403; 235/385

[56] References Cited

U.S. PATENT DOCUMENTS

| | | | |
|---|---|---|---|
| 2,964,140 | 12/1960 | Berezny | 280/33.994 X |
| 3,031,037 | 4/1962 | Stollman | 280/33.994 X |
| 3,652,103 | 3/1972 | Higgs | 280/33.994 |
| 4,242,668 | 12/1980 | Herzog | 340/539 |
| 4,577,880 | 3/1986 | Bianco | 280/33.994 |
| 4,593,273 | 6/1986 | Narcisse | 340/539 |
| 4,772,880 | 9/1988 | Goldstein et al. | 340/571 |
| 4,791,409 | 12/1988 | Reid | 340/539 |
| 4,987,406 | 1/1991 | Reid | 340/539 |

*Primary Examiner*—Thomas Mullen
*Attorney, Agent, or Firm*—Cahill, Sutton & Thomas

[57] ABSTRACT

A cart immobilizing mechanism responding to signals prescribing a permitted use area for the cart is contained entirely within a wheel of the cart. This mechanism preferably includes a circuit board containing a radio frequency receiver, a decoder, and a logic driver. The mechanism also includes a solenoid device. When the receiver detects that the cart has been moved outside the prescribed use area, the solenoid device is energized to drive its armature into an opening in a non-rotating shaft supporting a wheel, thereby locking the wheel against rotation and immobilizing the cart.

12 Claims, 2 Drawing Sheets

5,315,290

CART THEFT PREVENTION SYSTEM

TECHNICAL FIELD

This invention is concerned with immobilizing a shopping cart if an attempt is made to propel it outside a prescribed use area.

BACKGROUND ART

Many commercial establishments provide shopping carts for the convenience of their customers in transporting merchandise through the stores and to the customer's vehicles. Some of these establishments experience substantial financial burdens through the loss of carts, be it through outright theft or simple removal from the premises and negligent abandonment.

Others have sought to solve the lost cart problem by providing means for automatically disabling, or immobilizing, the cart if it is being moved outside a prescribed use area.

One of the earliest such proposals is disclosed in U.S. Pat. No. 2,964,140, granted Dec. 13, 1960, to M. N. Brezny for "Anti-Theft Device for Carts". Brezny proposed that one or more of the cart casters be equipped with a mechanism for inserting a pin into an opening in the wheel in the caster to lock the wheel against turning. Brezny provided a mechanism for actuating the locking pin into locking position in response to the caster being moved over a magnetic strip at the perimeter of the prescribed use area.

There are several shortcomings to the Brezny anti-theft device. First, the device requires that the magnetic strip be installed about the entire perimeter of the prescribed use area or that the area be fenced and the magnetic strips laid in a limited exit, neither of which approaches may be practical. Secondly, the immobilizing mechanism of the Brezny system is exposed to the view of the cart user and, therefore, susceptible to being disabled and rendered ineffective by a person bent on removing the cart. Lastly, the Brezny system requires store personnel to carry a magnet for resetting the locking mechanism if the cart is retrieved.

Another approach to cart immobilization is disclosed in U.S. Pat. No. 4,242,668, granted Dec. 30, 1980, to W. Herzog for "Cart Theft Prevention System". Herzog's cart is immobilized by unlatching a support structure for the front wheels of the cart, allowing the front of the cart frame to fall down into contact with the ground. Unlatching of the front wheel structure is accomplished in response to a signal receiver detecting a signal from a transmitter at the exit of the prescribed use area or the receiver loosing receipt of a signal which covers only the prescribed use area. The principal disadvantage of the Herzog system lies in the rather extensive and complex modification required for the cart undercarriage, making the retrofitting of existing carts prohibitively expensive. And, again, like Brezny, Herzog leaves the immobilizing mechanism open to vandalism and destruction by a would-be thief.

A somewhat more practical theft deterrent system, one which can be readily adapted to existing carts, is disclosed in U.S. Pat. No. 4,772,880, granted Sep. 20, 1988, to L. W. Goldstein, et al. for "Shopping Cart Anti-Theft System". The system disclosed in this patent utilizes a clamp-on assembly which houses a battery-powered receiver for sensing when the cart leaves the area adjacent the business and includes means for disabling a wheel of the cart when the cart is outside the area. Because the assembly is exposed, it is relatively easily removed or disabled.

There continues to be a need for a cart theft prevention system which is reliable in operation and which cannot be easily overridden or disabled by the cart user.

DISCLOSURE OF THE INVENTION

The theft prevention system of this invention responds to a transmitted signal, preferably a radio frequency signal, which prescribes a normal use area for the cart. The mechanism for immobilizing the cart if it is moved out of the prescribed use area is concealed from view within a wheel of the cart. The immobilizing mechanism includes a locking solenoid device under the control of the receiver responsive to the signal which prescribes the use area for the cart. When the cart moves out of that area, the solenoid device is energized to move an armature into an opening in the axle of the wheel to lock the wheel against turning, thereby immobilizing the cart.

Among other features of the theft prevention system of this invention is the use of coded transmitted signals whereby sets of carts from two or more nearby stores can be supervised throughout different, but overlapping, use areas. Each cart with a decoder associated with its receiver responds solely to the coded transmission from its store and not to the transmission of a different nearby store.

Another feature, which is optional, includes means within the wheel of the cart for transmitting a signal back to the store when the cart moves out of the prescribed area. This can serve to alert store personnel to a possible theft attempt.

BRIEF DESCRIPTION OF THE DRAWINGS

The invention is described in greater detail hereinafter by reference to the accompanying drawings, wherein.

BEST MODES FOR CARRYING OUT THE INVENTION

Figure 1:
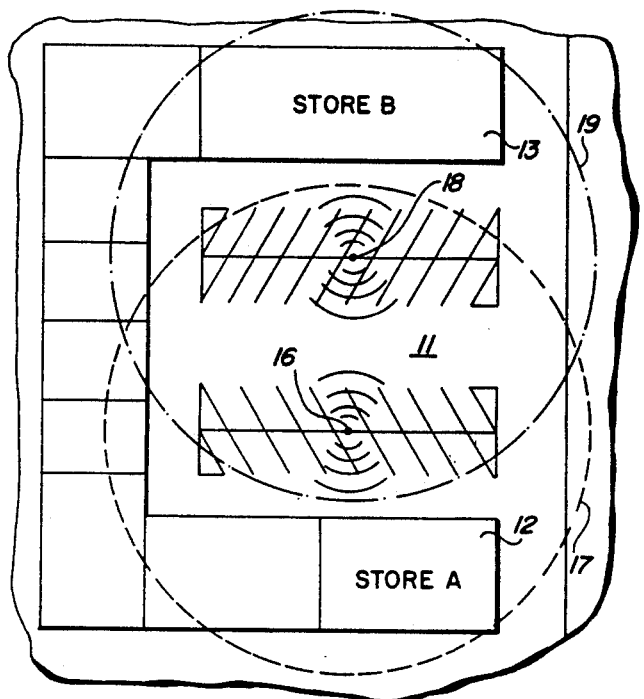
FIG. 1 is a plan view of a typical, multi-store shopping center in which the theft prevention system of this invention can be employed.
Figure 2:
FIG. 2 is a perspective view of a shopping cart equipped according to this invention.

FIG. 1 depicts in plan view a multi-store shopping center having a shared parking area designated generally by reference numeral 11. Of the several stores in the center, store A is designated by numeral 12 and store B is designed by numeral 13. Store A might be, for example, a supermarket offering a variety of food items and other merchandise. Store B, for example, could be a lumber and hardware outlet. Both store A and store B provide shopping carts, such as cart 14 shown in FIG. 2, for the convenience of their customers.

Both stores A and B intend that their carts 14 be used freely within the confines of their respective stores and throughout the shared parking area 11. Both stores, however, wish to prevent the removal of their carts from their respective prescribed use areas: the interior of store A and the parking area 11 for store A; the interior of store B and the parking area 11 for store B. It is to be noted that the prescribed cart use areas for the two stores are different, but share a sizable common area within which the carts 14 from both stores can be used by customers transporting purchases to their parked vehicles.

Like some cart theft prevention systems proposed previously, the system of this invention prescribes the use areas for the carts with signal transmitters to which the carts are equipped to respond. The preferred transmission system of this invention is a limited distance radio frequency transmission coded for each store and its respective carts. Store A, for example, can be provided with a signal transmission system coupled with a radiating antenna 16 and providing a signal transmission range indicated by dash line 17. Store B's transmission system has a radiating antenna 18 and a signal transmission range indicated by dot-dash line 19. Removal of the cart from store A from its prescribed use area, namely transmission range 17, results in the cart being immobilized to prevent further removal. Likewise, removal of the cart from store B with its prescribed use area, namely transmission range 19, results in the cart being immobilized to prevent further removal.

Figure 3:
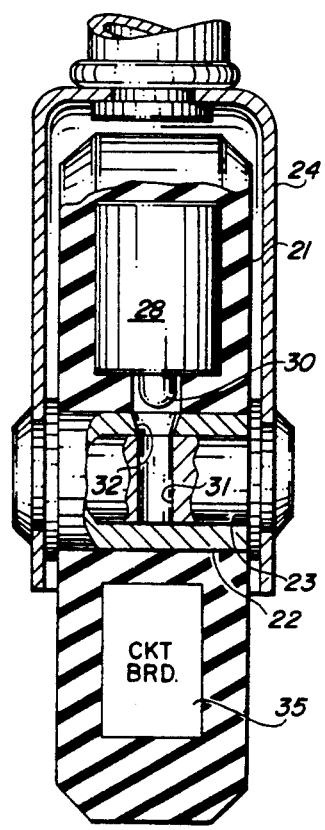
FIG. 3 is a vertical sectional view taken from the front of one of the wheels of the shopping cart.
Figure 4:
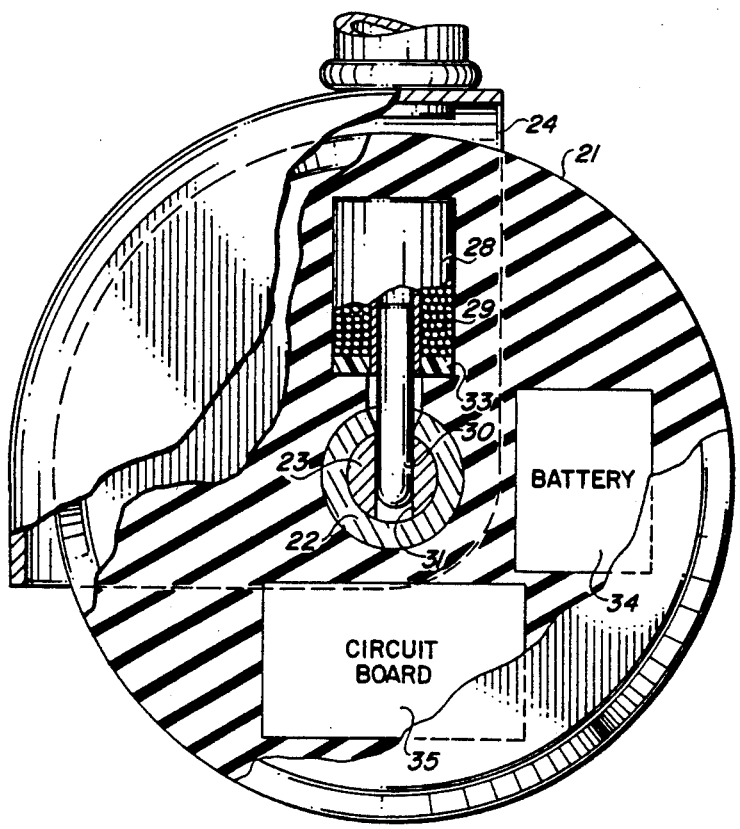
FIG. 4 is a vertical sectional view taken from the side of the wheel shown in FIG. 3.
Figure 5:
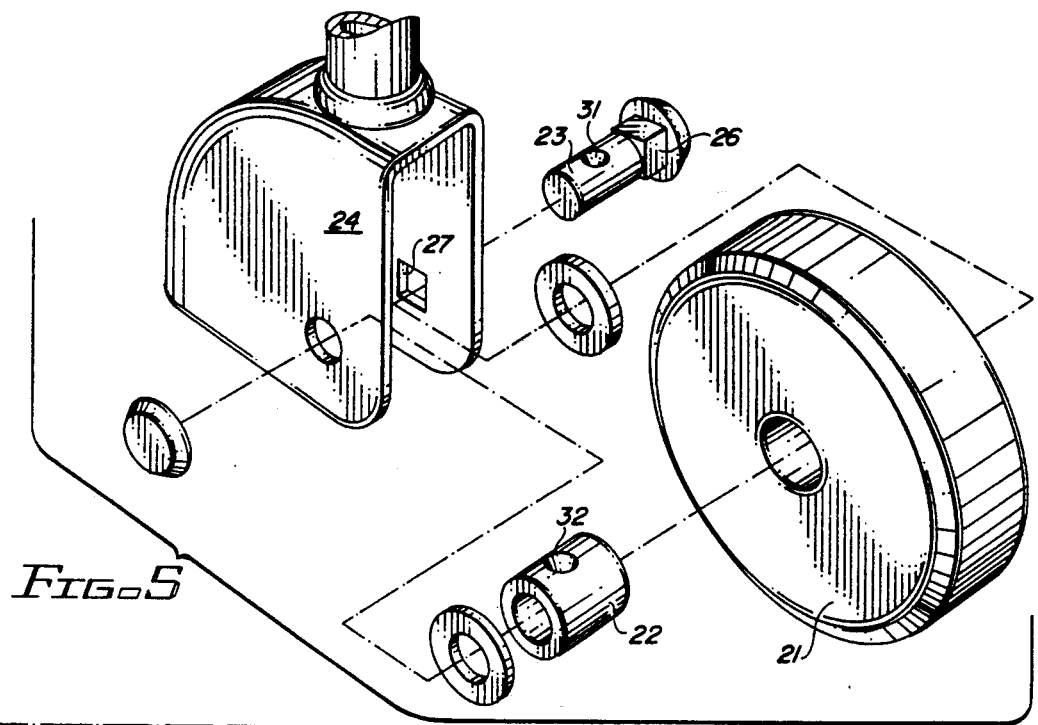
FIG. 5 is an exploded perspective view of the wheel shown in FIGS. 3 and 4.

The mechanism for immobilizing a cart is illustrated in FIGS. 3-5. In accordance with this invention, the immobilizing mechanism is hidden from view within the confines of a wheel 21 of the cart 14.

Wheel 21 is preferably molded from a hardened rubber, or rubber-like, material with a sleeve bearing 22 provided for rotation on a stationary axle 23 mounted in a caster yoke 24. Axle 23 is provided with a non-circular end region 26 which is received in a similarly shaped opening 27 in one leg of the yoke 24 to prevent rotation of the axle (see FIG. 5).

Immobilization of cart 14 is accomplished by locking wheel 21 against rotation on axle 23. For this purpose, there is contained within the wheel a solenoid device 28 comprising a coil 29 and an armature 30. Armature 30 is movable from a first, or non-locking, position (FIG. 3) in which it is clear of axle 23, to a second, or locking position (FIG. 4), in which it enters an opening 31 in the axle. An opening 32 in sleeve bearing 22 is aligned with armature 30 to permit its passage into the axle.

Solenoid device 28 is preferably of the dual latching type in which the armature 30 is releasably retained in the position to which it is driven by coil 29. One mechanism for accomplishing this is a permanent magnet 33 surrounding the armature at the end of the coil 29 (see FIG. 4). Magnet 33 functions to attract and releasably hold the armature in either of its two positions. Magnetic forces created by coil 29 are sufficient to overcome the attraction of magnet 33 to move the armature in or out, depending on the direction of current flow through the coil.

It will be noted that the path of movement of armature 30 is radially of and normal to the axis of axle 23. This enables the armature to enter directly into the opening 31 in the axle. No complicated linkage or lever mechanism is required.

Activation of solenoid device 28 to immobilize or mobilize wheel 21 is under the control of a receiving unit also contained within the confines of wheel 21. As shown in FIGS. 3 and 4, this receiving unit comprises a battery 34 and a circuit board 35 housed in pockets provided therefor in the wheel. These components, plus solenoid device 28, are preferably sealed within the confines of wheel 21 so that they are not visible to a user of the cart and are inaccessible to the user. This arrangement greatly reduces the opportunity for a cart user to defeat the theft prevention system by disabling the immobilizing unit.

Figure 6:
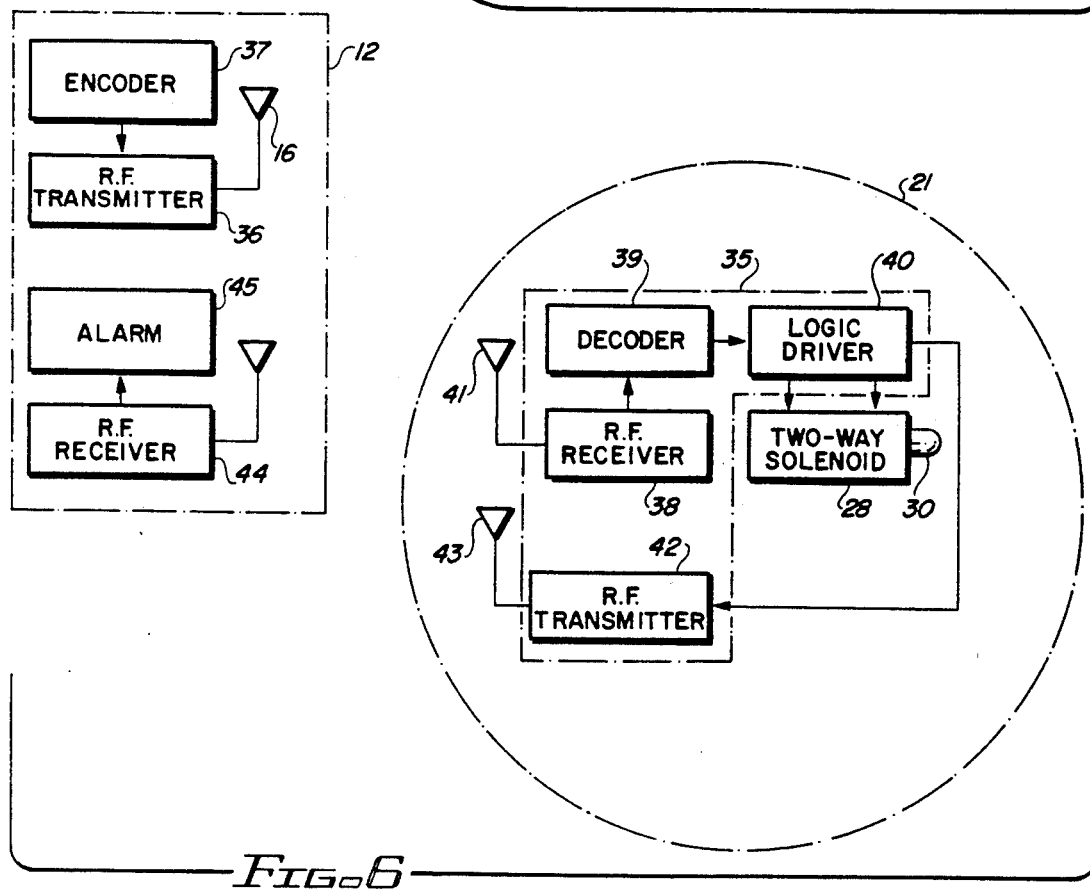
FIG. 6 is a block diagram of signal transmitting and receiving equipment employed in the theft prevention system.

Referring now to FIG. 6, there is shown a block diagram illustrating the signal transmitting and receiving components of the theft prevention system of this invention. On the left are the components associated with the store and on the right are the components contained within the wheel 21 of the cart 14.

The signal transmission components associated with, for example, store A include a radio frequency transmitter 36 which sends a signal to antenna 16 under control of encoder 37.

The encoded signal emanating from antenna 16 is one that can be received by and recognized by the receiving system in the wheel 21 of the cart 14 provided by store A. The circuit board 35 within wheel 21 includes the components for a radio frequency receiver 38 which is capable of receiving the signal from antenna 16 over its own antenna 41. Circuit board 35 also contains the components for a decoder 39 capable of discerning whether the coded signal received by receiver 38 matches the code associated with that cart's store, and a logic driver 40 which is electrically connected to solenoid device 28.

The function of logic driver 40 is to transmit a short pulse of electrical energy to solenoid device 28 upon being informed by decoder 39 that the coded signal from the cart's store has either been newly "lost" or newly "found". If the signal has been newly lost, this indicates that the cart has been moved from inside to outside its prescribed use area, i.e., beyond the range 17 of the store transmitter. When the logic driver 40 senses this condition, it sends a pulse of electrical current to the solenoid device 28 in a direction to cause the armature 30 to move from its first to its second position within the opening 31 in axle 23. This locks the wheel 21 against further turning and immobilizes the cart 14.

This manner of immobilizing the cart is usually sufficient to deter a would-be thief from carrying off the cart. Although the thief could pick up the cart and carry it off, he or she has little incentive for doing so. After all, the cart is heavy, and little interest is evoked for carrying a cart which has been rendered useless by a seemingly unexplained breakdown. Keep in mind that the immobilizing mechanism is contained entirely within the confines of the wheel 21 and is undetectable by the cart user.

When the cart is retrieved by store personnel, it need only be dragged a few feet back into its prescribed use area to be again mobilized. The newly "found" coded signal injected into logic driver 40 causes a short pulse of electrical current to be transmitted in the opposite direction to solenoid coil 29 to retract armature 30 from the axle 23. The cart 14 is now automatically reusable within the prescribed use area.

The use of a logic driver 40 for supplying electrical energy to solenoid device 28 in short bursts greatly conserves energy and prolongs the useful life of the battery 34. The radio receiver 38, the decoder 39, and the logic driver 40 in circuit board 35 can be formed by integrated circuits having very low power consumption. Hence, a reasonably sized battery can power these devices for very long periods of time, say, three or more years. On the other hand, solenoid device 28 is a fairly high power consumption device and should be energized for short periods of time, only, say five seconds, when the cart is to be immobilized or mobilized.

The "smart" wheel 21 of this invention can, if desired, be equipped with the further feature of alerting store personnel that the cart has been moved out of its prescribed use area. Included in the circuit board 35 for this purpose, is a radio frequency transmitter 42 which is connected to an antenna 43 and controlled by logic driver 40. When the logic driver imparts electrical current to solenoid device 28 to lock wheel 21, the logic driver 40 also energizes transmitter 42 to send out a signal that can be received by a receiver 44 in the store. Receiver 44, in turn, activates an alarm 45 to alert store personnel that a cart has been moved out of its prescribed use area.

This invention has been described by reference to its preferred embodiments. It should be understood that various changes and modifications can be made therein, all of which fall within the scope of the appended claims, without departing from the spirit and scope of the invention. For example, the invention is described in reference to a system in which the cart becomes immobilized upon being moved outside the range of a radio frequency transmitter. It should be apparent that if the vehicle parking area has but limited ingress and egress, immobilization of the carts can be controlled by signal transmitters placed at the exit or exits of the parking area. And, the signals transmitted can be other than radio frequency signals.

What is claimed is:

1. A wheeled cart immobilizing system comprising a cart, a wheel, a stationary axle supporting said wheel, said wheel being mounted so as to rotate on said axle whereby said cart is rendered mobile, said axle having an opening therein within the confines of said wheel, a solenoid device within the confines of said wheel, said solenoid device including an armature, said armature being positioned at one of first and second positions which are respectively outside and inside the opening in said axle for respectively allowing rotation of the wheel on the axle and locking the wheel against rotation on the axle, and means for activating the solenoid device to move said armature to said second position in response to movement of the cart out of a prescribed area.

2. The cart immobilizing system of claim 1, further characterized in that said axle has an elongated axis and the path of movement of said armature is radially of and normal to the axis of said axle.

3. The cart immobilizing system of claim 1, further characterized in that the means for activating said solenoid device includes a radio frequency receiver within the confines of said wheel.

4. The cart immobilizing system of claim 3, wherein said solenoid device and said radio frequency receiver are completely concealed from view within said wheel.

5. The cart immobilizing system of claim 3, further characterized in that said means for activating said solenoid device includes a decoder device within the confines of said wheel.

6. The cart immobilizing system of claim 5, further characterized in that said means for activating said solenoid device includes a logic driver within the confines of said wheel for selectively energizing said solenoid device to cause said armature to move between its first and second positions.

7. The cart immobilizing system of claim 1, further characterized in that said solenoid device includes means for retaining said armature in one of said first and second positions when the solenoid device is not energized.

8. The cart immobilizing system of claim 2, further characterized in that said solenoid device includes means for retaining said armature in one of said first and second positions when the solenoid device is not energized.

9. The cart immobilizing system of claim 1, further characterized in that said activating means causes said solenoid device to move said armature to its said second position in response to movement of said cart from inside said prescribed area to outside said area and causes said solenoid device to move said armature to its said first position in response to movement of said cart from outside said prescribed area to inside said area.

10. A cart theft prevention system for at least two stores whose customers share a parking area, each of said stores having a plurality of wheeled carts for the convenience of its customers in transporting merchandise through the store and into the parking area, each of said stores having means for transmitting a coded radio frequency signal throughout its own store and throughout the parking area, the radio frequency code for one of the stores differing from the radio frequency code of the other store, radio frequency receivers on each of the carts of both of said stores, the receivers on the carts from said one store responding only to the coded signal from said one store, the receivers on the carts from the other store responding only to the coded signal from said other store, and means on each of said carts for immobilizing the respective cart in response to the respective receiver losing reception of the coded signal from the respective cart's store.

11. The cart theft prevention system of claim 10, further characterized in that the radio frequency receiver and immobilizing means for each cart are contained within a wheel of the cart.

12. A cart theft prevention system comprising a limited range radio frequency transmitter, a wheeled cart intended for use within the range of the transmitter, means for selectively immobilizing and mobilizing said cart, said last-named means immobilizing said cart in response to the cart being moved from inside the range of the transmitter to outside that range and mobilizing said cart in response to the cart being moved from outside the range of the transmitter to inside that range, and a radio frequency transmitter associated with said cart, means for activating said cart associated transmitter to transmit a signal when said crt if immobilized, and means for detecting a signal from said cart associated transmitter, said means for selectively immobilizing and mobilizing said cart and said cart associated transmitter being positioned within the confines of a wheel of the cart.

* * * * *